United States Patent [19]

Bulanda et al.

[11] 4,009,852
[45] Mar. 1, 1977

[54] CORNER POST HARNESS ASSEMBLY APPARATUS

[75] Inventors: John Jean Bulanda, New Lenox, Ill.; David Robert Schoenfeld, Sandy, Utah

[73] Assignee: Panduit Corporation, Tinley Park, Ill.

[22] Filed: Sept. 15, 1975

[21] Appl. No.: 613,383

[52] U.S. Cl. .................. 248/68 R; 24/73 SA; 24/249 FP; 24/255 AS; 29/755
[51] Int. Cl.² ........................................ F16L 3/22
[58] Field of Search ........ 24/73 SA, 73 AP, 73 PB, 24/81 KK, 81 WH, 132 R, 132 SB, 132 CS, 132 CH, 249 FP, 255 AS, 255 C; 29/203 R, 203 D, 203 P, 203 MM, 203 MW; 248/49, 64, 67.5, 67.7, 68, 74 R, 74 A, 74 B, 113, 312, 313, 316 R, 316 B; 269/41, 43, 45

[56] References Cited

UNITED STATES PATENTS

| 392,861 | 11/1888 | Geyer | 248/312 |
|---|---|---|---|
| 587,775 | 8/1897 | Yockel | 248/316 B X |
| 1,713,415 | 5/1929 | Allen | 248/312 |
| 2,735,663 | 2/1956 | Holt | 248/316 B |
| 3,258,039 | 6/1966 | Ewalt | 29/203 MW |
| 3,270,994 | 9/1966 | Machan et al. | 248/316 B |
| 3,346,688 | 10/1967 | Fields | 24/73 SA |
| 3,540,110 | 11/1970 | Schwartz | 29/203 P |
| 3,568,964 | 3/1971 | Perkins | 248/68 R |
| 3,792,829 | 2/1974 | Fickett | 248/316 R |
| 3,839,777 | 10/1974 | Puzio | 29/203 MW |

FOREIGN PATENTS OR APPLICATIONS

| 1,104,765 | 4/1961 | Germany | 24/73 SA |
|---|---|---|---|
| 7,239 | 6/1885 | United Kingdom | 248/74 R |

*Primary Examiner*—Lawrence J. Staab
*Attorney, Agent, or Firm*—Richard B. Wakely; Charles R. Wentzel

[57] ABSTRACT

Harness assembly apparatus for maintaining close grouping of a plurality of flexible elongate objects such as wires as the objects make a turn and are formed into a bundle. The apparatus includes retaining means for releasably holding the objects and further includes support means to be mounted on a panelboard or the like and supporting the retaining means. The retaining means includes generally rigid abutment means which engages the bundle and defines the turn therein, and an arm captively held by the support means. The arm is movable relative to the support means between a retaining position wherein it is disposed above the abutment means and extends at least partially outside the turn and a release position wherein the arm is disposed substantially inside the turn of the bundle. At least a portion of the abutment means is responsive to movement of the arm towards its release position to move away from the turn of the bundle as defined by the abutment means when the arm is in its retaining position. After the formation of the objects into the bundle, it can readily be removed from the apparatus after moving the arm towards its release position.

5 Claims, 14 Drawing Figures

CORNER POST HARNESS ASSEMBLY APPARATUS

BACKGROUND OF THE INVENTION

This invention relates to harness assembly apparatus and more particularly, to a corner post for holding objects to be bundled as the bundle makes a turn.

In the formation of a bundle from a plurality of flexible elongate objects such as wires, each wire is typically run individually on a panelboard between its desired termination points with the wire placed in a plurality of holding devices disposed along straight run portions of the desired bundle path. These holding devices generally tend to form the wires into a grouping of general circular cross section to permit convenient installation and tightening of cable ties. Examples of such holding devices and cable ties are disclosed in commonly-assigned U.S. Pat. Nos. 3,627,300 and 3,872,547, respectively. Heretofore, objects such as nails or dowels were used as supports for forming a turn in the bundle. However, as these supports generally extended vertically from the wiring board, care was required to keep the wires under tension to prevent their slipping over the top of the support. Additionally, such straight supports tended to disperse the wires from their circular grouping with the result that after a cable tie was applied near the support and after removal of the bundle from the panelboard, the wires would reassume a circular cross-sectional grouping and since a circle has a smaller periphery for a given cross section than any other configuration, the cable tie would become unacceptably loose.

To overcome these disadvantages of simple prior art supports, several types of corner posts have been proposed. Among these includes a support having a vertical section engaging the wires with a lip extending as a cantilever from the top of vertical section outside the turn to restrain wires from freeing themselves of the corner post. However, after the bundle was completed, it had to be loosened from the various holding devices to provide sufficient slack in the bundle to enable it to clear the lip and be removed from the wiring board.

Another prior art corner post includes a bundle holder and a separate mounting base including a latch mechanism for releasably retaining the holder. Although after completing the bundle the assembler was not required to provide slack in the bundle before removing it from the corner post, he or she was required to perform the additional step of manually actuating the latch to separate the holder from the base. The assembler was also required to keep track of the loose holder and replace it on the base before starting fabrication of a subsequent bundle.

SUMMARY OF THE INVENTION

Among the several objects of the present invention may be noted the provision of improved harness assembly apparatus which prevents a lightly tensioned wire from escaping from the bundle; the provision of such apparatus which supports a turn in the bundle while maintaining the generally circular cross-sectional shape of the bundle; the provision of such apparatus which readily releases the bundle upon the assembler's pulling the bundle generally straight upwardly away from the wiring board without requiring slackening of the bundle; the provision of such apparatus which captively holds the components constituting the apparatus and avoids requiring the assembler to keep track of loose pieces and replace them before starting fabrication of another bundle; and the provision of such apparatus which has long service life and which is simple and economical to manufacture. Other objects and features of the present invention will be in part apparent and will in part be pointed out in the following specification and in the claims attendant thereto.

Briefly, the corner post harness assembly apparatus of the present invention includes retaining means and support means. The former releasably holds the objects as they make a turn while the latter is mounted on a panelboard and supports the retaining means. The retaining means includes an arm captively held by the support means and movable relative to the support means between a retaining position and a release position. The retaining means also includes generally rigid abutment means engaging the bundle and defining the turn therein. In its retaining position, the arm is disposed above the abutment means and extends at least partially outside the bundle's turn while in its release position, the arm is disposed substantially inside the turn. At least a portion of the abutment means is responsive to movement of the arm towards its release position to move away from the turn of the bundle as defined by the abutment means when the arm is in its retaining position. After completion of bundle fabrication, the bundle can conveniently be removed from the apparatus after moving the arm towards its release position.

BRIEF DESCRIPTION OF THE DRAWINGS

Corresponding reference characters indicated corresponding parts throughout the several views of the drawings.

DESCRIPTION OF THE PREFERRED EMBODIMENT

Figure 1:
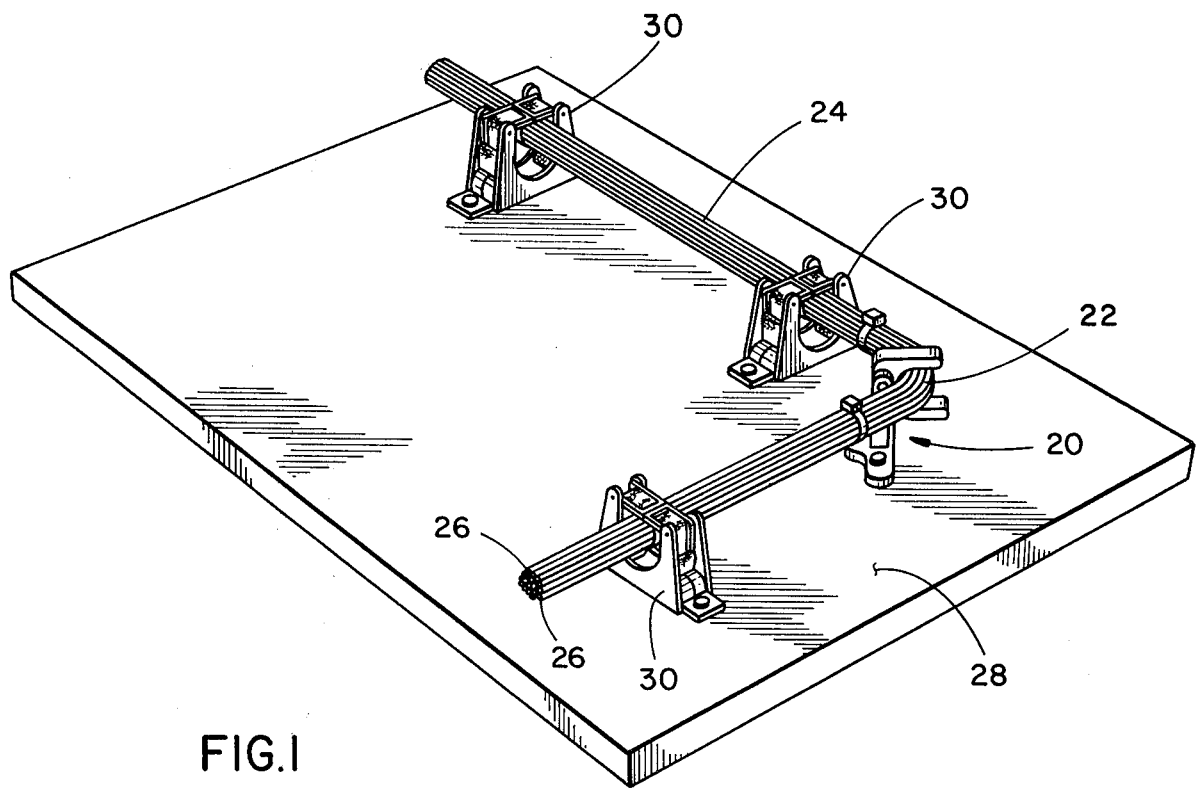
FIG. 1 is a perspective view of a wiring board including corner post harness assembly apparatus of the present invention along with various other harness assembly equipment.

Referring now to FIG. 1, corner post harness assembly apparatus, for forming and supporting a turn 22 in a bundle 24 comprisng a plurality of elongate flexible objects 26 such as wires, is generally indicated by reference numeral 20. As will appear more fully hereinafter, assembly apparatus 20 is preferably mounted on a panelboard 28 or the like and used in conjunction with holders 30 which form and support the straight run portions of the desired bundle route. An example of such a holder is fully disclosed in commonly assigned U.S. Pat. No. 3,627,300 and is adapted to form the objects into a bundle of generally circular cross section and to release the bundle upon its being pulled straight upwardly away from the panelboard.

Figure 3:
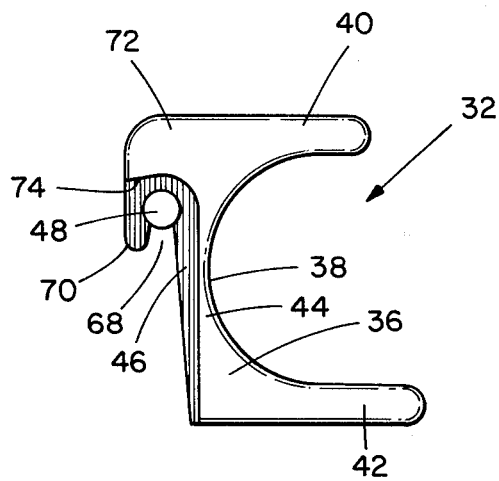
FIGS. 3, 4, and 5 are, respectively, side, end, and bottom elevational views of the harness retaining means.
Figure 4:
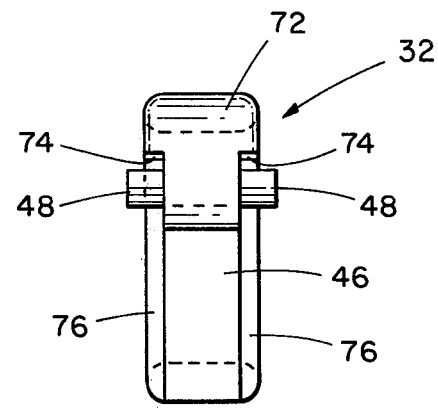
Figure 5:
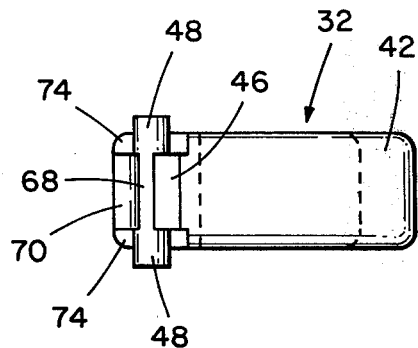
Figure 6:
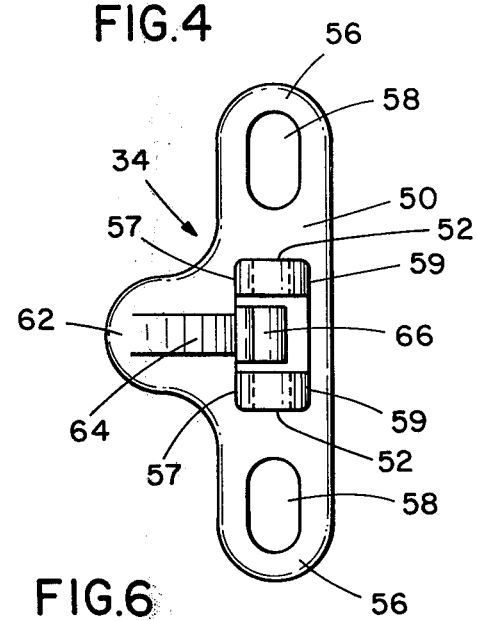
FIGS. 6, 7, and 8 are, respectively, a plan, and front and side elevational views of the support means of the present invention.
Figure 7:
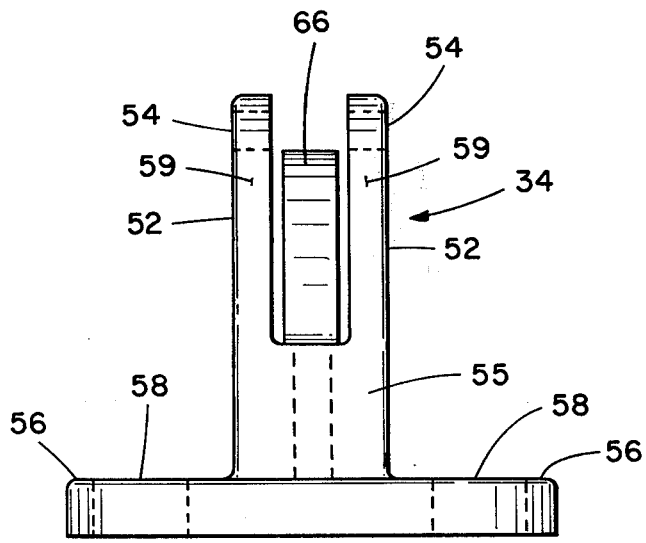
Figure 8:
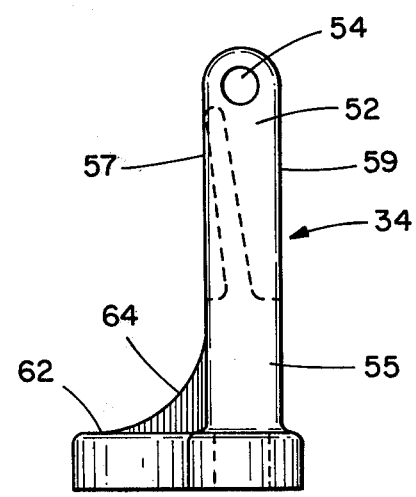

Assembly apparatus 20 comprises retaining means 32, see FIGS. 3–5, for releasably holding objects 26 as they make the desired turn and further comprises support means 34, shown in FIGS. 6–8, adapted to be mounted on panelboard 28 and which captively holds and supports retaining means 32. The retaining means and the support means are each preferably of integral molded plastic construction.

More specifically, retaining means 32 includes a generally U-shaped channel 36 having a concave inner surface 38 for engaging objects 26 as they are formed into the bundle. Channel 36 includes a first or upper arm 40, a second or lower arm 42, and a web portion 44 disposed intermediate of and joining the arms with each arm and the web portion each having a surface which together constitute inner surface 38. The web portion is rigid and constitutes abutment means for engaging the bundle and defining the turn therein. Web portion 44 and arm 40 can be considered to partially define an open mouth channel disposed intermediate arm 40 and panelboard 28 for receiving objects 26. Web portion 44 includes an elongate recessed lip 46 extending oppositely from arms 40, 42 and having a pair of transverse trunnions 48 adjacent upper arm 40 for pivotally mounting the retaining means on support means 34.

The support means comprises a mounting base 50 and a pair of spaced elongate legs 52 extending generally vertically therefrom. The distal end of each leg is rounded and each leg includes a transverse aperture 54 for receiving a respective trunnion 48. Each leg includes a generally flat back surface 57 and a generally flat front surface 59. The spacing between legs 52 is sufficient for lip 46 to be received therebetween. It is noted that legs 54 are somewhat flexible and with difficulty can be separated sufficiently for trunnions 48 to be placed in respective apertures 54; however, when apparatus 20 is in use, legs 54 captively hold retaining means 32 to prevent its inadvertant separation from support means 34. Additionally the ends of trunnions 48 could be beveled to function as cam surfaces thereby to facilitate spreading legs 52.

The mounting base 50 includes an upright section 55 and a pair of oppositely extending feet 56 each having an aperture 58 for receiving a machine screw 60 or the like thereby securely mounting the base to panelboard 28. Base 50 also includes an outrigger 62 adapted to engage panelboard 28 and extending inside and away from the turn of the bundle to support apparatus 20 when the bundle is under tension. Upright section 55 and outrigger 62 are joined by a reinforcing rib 64.

Figure 2:
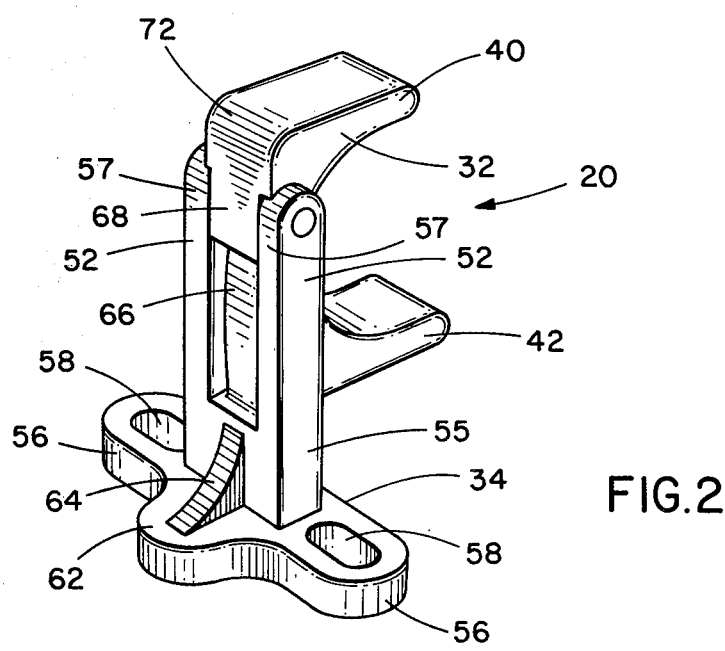
FIG. 2 is a perspective view of the corner post harness assembly apparatus which includes a harness retaining means and a support means.
Figure 9:
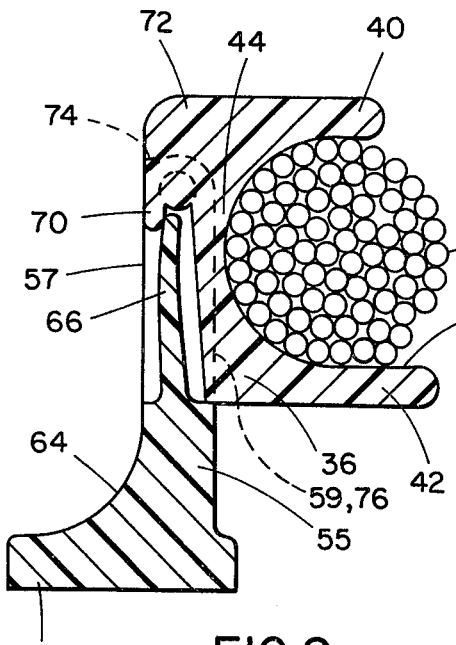
FIG. 9 is a cross-sectional view of the assembly apparatus of FIG. 2, showing the retaining means in its retaining position and holding a plurality of elongate flexible objects such as wires.
Figure 10:
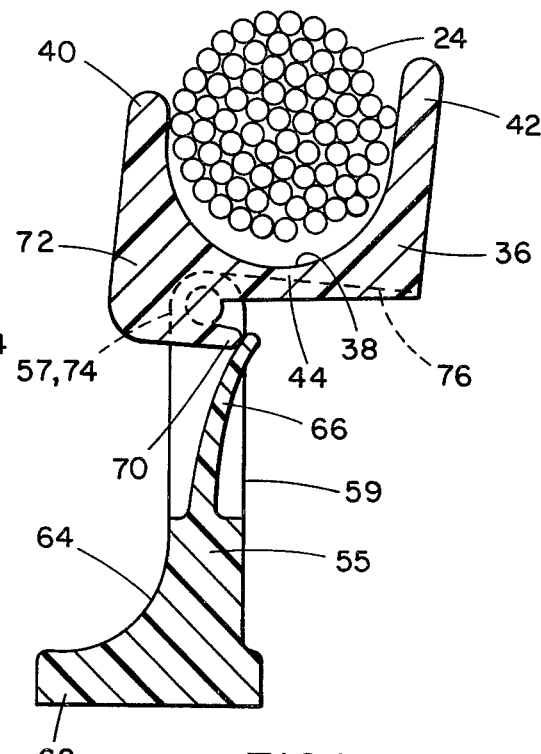
FIG. 10, similar to FIG. 9, shows the retaining means in its release position wherein the bundled objects can readily be removed from the corner post harness assembly apparatus.

Upper arm 40, and more particularly the entire retaining means 32, is movable between a retaining position, shown in FIGS. 1, 2 and 9, wherein arm 40 is disposed above web portion 44 and extends generally parallel to panelboard 28 and at least partially outside turn 22 of bundle 24, and a release position, shown in FIG. 10, wherein the arm 40 is disposed substantially inside the turn of the bundle and extends generally vertically from legs 52. Of course, the turn 22 in bundle 24 is defined by abutment means or web portion 44 when arm 40 is in its retaining position as shown in FIGS. 1, 2 and 9. It is to be appreciated, as shown in FIG. 10, that a portion of abutment means or web portion 44 adjacent first arm 40 is responsive to movement of arm 40 towards its release position to move away from and inside the turn of the bundle as defined by abutment means 44 when arm 40 is in its retaining position. Apparatus 20 also includes means biasing arm 40 toward its retaining position and comprising a cantilever beam spring 66 integral with support means 34 extending between legs 52. The free end of spring 66 is received within a slot 68 in the retaining means extending generally parallel to the longitudinal direction of web portion 44 and defined by recessed lip 46 and a nose 70 adjacent trunnions 48.

Retaining means 32 also comprises a crown 72 extending away from arm 40 and over the ends of legs 52. Crown 72 includes a pair of transverse surfaces 74 shaped complimentary to the rounded leg ends and which, as shown in FIG. 10, abut the back, straight surfaces 57 of the legs 52 when arm 40 is in its release position thereby serving as stop means to limit movement of arm 40 to its release position. Similarly, web portion 44 includes a pair of transverse surfaces 76 adjacent recessed lip 46 constituting stop means and engagable with legs 52 to limit movement of arm 40 to its retaining position.

Operation of corner post harness assembly apparatus 20 is as follows: After corner post apparatus 20 and holders 30 are positioned on panelboard 28 with holders 30 defining the straight run portions of the bundle route and apparatus 20 defining the desired bundle turns, wires 26 are placed in the holders and between arms 40, 42 of apparatus 20. Holders 30 form the wires into a bundle of generally circular cross section and the concave inner surface 38 of U-shaped channel 36 engages the bundle and tends to maintain the bundle's circular cross section as the bundle makes a turn. After completion of the wiring, cable ties or the like are applied to permanently hold the wires in their bundled condition. It is noteworthy that lower arm 42 holds the bundle above the panelboard 28 to provide sufficient space for the jaws of an automatic cable tie installation tool, such as fully disclosed in commonly-assigned U.S. patent application Ser. No. 450,523, filed Mar. 12, 1974, to be placed about the bundle.

Bundle 24 is removed from apparatus 20 and holders 30 by merely grasping the bundle and pulling it generally straight upwardly away from the panelboard. As bundle 24 is moved upwardly, it slides along inner surface 38 causing retaining means 32 to pivot on trunnions 48 about legs 52 and nose 70 to bear against cantilever beam spring 66. When transverse crown surfaces 74 abut against the back surfaces 57 of legs 52 (see common lead line in FIG. 10), the retaining means is in its release position wherein upper arm 40 is disposed within the turn 22 of the bundle so that the bundle can be removed from apparatus 20 without interference from arm 40. After bundle 24 clears arm 40, the retaining means 32, under the bias of spring 66 bearing against nose 70, returns to its retaining position wherein surfaces 76 of the web portion 44 engage the respective front surfaces 59 of legs 52 (see common lead line in FIG. 9) and apparatus 20 is in position for the fabrication of a subsequent bundle.

Figure 11:
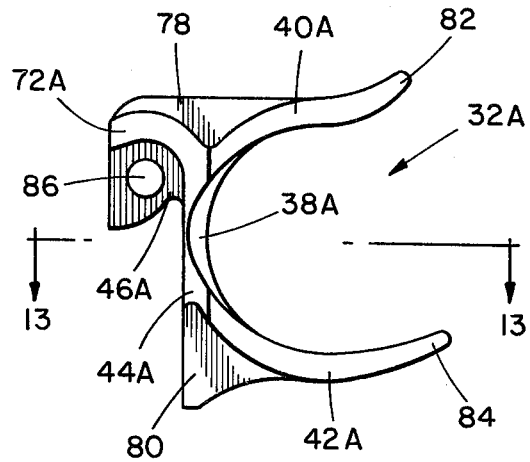
FIGS. 11 and 12, respectively, are a front elevational view and a plan of an alternate embodiment of the retaining means of the present invention.
Figure 12:
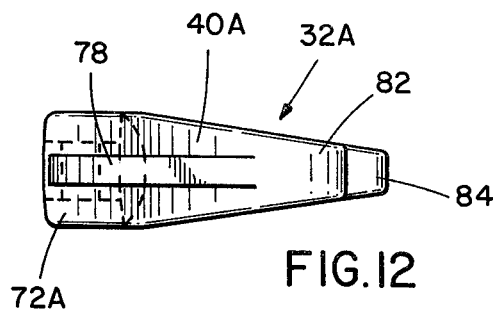
Figure 13:
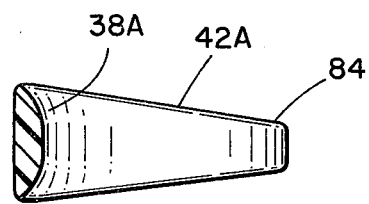
FIG. 13 is a sectional view generally along line 13—13 of FIG. 11.

Referring to FIGS. 11–13, an alternate embodiment of the retaining means of the present invention is shown at 32A. Components of retaining means 32A similar to previously described components of retaining means 32 are designated by the suffix "A". Retaining means 32A is similar to retaining means 32 previously described except the distal end portions 82, 84 of arms 40A, 42A, respectively, are bent upwardly out of the longitudinal direction of the arms, thereby facilitating disposition of the wires 26 between the arms. That is, the end portions extend away from the panelboard when the arms are in their retaining position. Additionally, inner surface 38A of channel 36A is transversely rounded to present a generally smooth surface for engaging the wires 26 as they make their turn. More specifically, surface 38A has an increasing convexity of edge radius toward the center of its concave profile. Furthermore, the recessed lip 46A of the web portion includes a transverse aperture 86 receiving trunnions, as will be understood, carried by the legs of the support means. The sides of lip 46A and the ends of the trunnions are preferably beveled to act as cam surfaces to facilitate mounting of retaining means 32A on its support means. Retaining means 32A furthermore includes a pair of reinforcing ribs 78, 80 which, respectively, join arm 40A and crown 72A, and lower arm 42A and web portion 44A. Operation of retaining means 32A is substantially as previously described with regard to retaining means 32.

Figure 14:
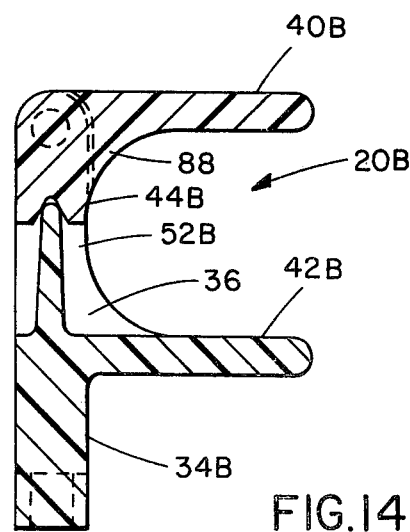
FIG. 14, similar to FIG. 9, is a cross-sectional view of an alternate embodiment of the corner post harness assembly of the present invention.

Another alternate embodiment 20B of the present invention is shown in FIG. 14. Components of apparatus 20B, similar to components of apparatus 20, are indicated by the suffix "B". Apparatus 20B includes an upper arm 40B which is integral with a part 88 which together with legs 52B constitute web portion or abutment means 44B. In corner post harness assembly apparatus 20B only upper arm 40B and part 88 are movable relative to the support means 34B. More particularly, lower arm 42B is integral with the support means and extends as a cantilever therefrom. As in the previously-described embodiments, arm 40B is pivotally mounted on the support means and movable between a retaining position, shown in FIG. 14, wherein arm 40B extends generally parallel to the panelboard and inside the desired turn of the bundle, and a release position wherein arm 40B extends generally vertically with respect to legs 52B and inside of the bundle turn. Also similar to the previously-described embodiments, the portion of part 88 adjacent arm 40B is responsive to movement of the arm towards its release position to move away from the turn of the bundle.

It should be noted with regard to any of the above-described embodiments, that lower arm 42 may be omitted if it is not desired to support the bundle above the surface of the panelboard.

It should also be appreciated that a pair of the corner posts 20 could be used to hold a straight run portion of the bundle by mounting them with the mouths of the respective channels 36 opposing and with respective arms 40 and 42 extending transversely to the bundle path to partially define a bundle-receiving opening.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. Harness assembly apparatus for maintaining close grouping of a plurality of flexible elongate objects such as wires as the objects make a turn and are formed into a bundle, said apparatus comprising:

retaining means for releasably holding the objects as they make a turn; and support means adapted to be mounted on a panelboard or the like and supporting the retaining means, said retaining means comprising generally rigid abutment means for engaging said bundle and defining the turn therein and further comprising a first arm captively held by said support means and movable relative to said support means between a retaining position wherein said arm is disposed above said abutment means and extends at least partially outside the turn of said bundle and a release position wherein the arm is disposed substantially inside the turn, at least a portion of said abutment means being responsive to movement of said arm towards its release position to move away from the turn of said bundle as defined by said abutment means when said arm is in its retaining position whereby after the objects are formed into said bundle, the bundle can readily be removed from said apparatus after moving said arm towards its release position, said support means comprising a mounting base for securement to said panelboard and further comprising a pair of spaced generally parallel legs extending from said base for holding said retaining means, said retaing means being integral and comprising a generally U-shaped channel having a generally concave inner surface engaging said bundle, said channel further including said first arm, a second arm extending generally parallel to said first arm, and a web portion joining said arms and including a recessed lip disposed between said lips, said lip being pivotally carried between said legs, said web portion including a slot extending generally parallel to the longitudinal direction of said web portion, said mounting base including biasing means comprising a cantilever beam spring extending between said legs and into said slot biasing said first arm to its retaining position wherein it extends generally parallel to said panelboard, said first arm being pivotable to its release position wherein it extends generally normal to said panelboard.

2. Apparatus as set forth in claim 1 wherein said lip is pivotally carried between said legs by trunnions extending from said lip and said slot is located adjacent said trunnions.

3. Apparatus as set forth in claim 1 wherein said lip is pivotally carried between said legs by a trunnion extending from each leg and said slot is located adjacent said trunnions.

4. Harness assembly apparatus for maintaining close grouping of a plurality of flexible elongate objects such as wires as the objects make a turn and are formed into a bundle, said apparatus comprising:

retaining means of one-piece molded plastic construction for releasably holding the objects as they make a turn; and support means of one-piece molded plastic construction adapted to be mounted on a panelboard or the like and supporting the retaining means, said retaining means comprising a first arm releasably pivotally held by said support means and movable relative thereto between a retaining position wherein said arm extends at least partially outside the turn of said bundle and a release position wherein the arm is disposed substantially inside the turn, said support means comprising a mounting base for securement to said panelboard and a pair of spaced flexible generally parallel legs extending from said base for holding said retaining means, said support means comprising a second fixed arm disposed between said first arm and said mounting base and extending generally parallel to said first arm when said first arm is in its retaining position, one of said retaining means and said support means comprising a web portion extending between said arms for engaging the bundle and defining the turn therein, and further comprising a slot, the other of said retaining means and support means comprising a cantilever beam spring extending between said legs and into said slot biasing said first arm to its retaining position whereby after the objects are formed into said bundle, the bundle can readily be removed from said apparatus after moving said arm towards its release position and, after removal of the bundle, said first arm returns toward its retaining position regardless of the mounting position of said apparatus.

5. Apparatus as set forth in claim 4 wherein said retaining means comprises said web portion and said support means comprises said spring.

* * * * *

UNITED STATES PATENT AND TRADEMARK OFFICE
CERTIFICATE OF CORRECTION

PATENT NO. : 4,009,852
DATED : March 1, 1977
INVENTOR(S) : John J. Bulanda, David R. Schoenfeld It is certified that error appears in the above-identified patent and that said Letters Patent are hereby corrected as shown below:

Column 6, line 39: "retaing" should be --retaining--;

line 46: "lips" should be --legs--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks